United States Patent
Pletner et al.

(10) Patent No.: US 7,701,111 B2
(45) Date of Patent: Apr. 20, 2010

(54) KIT AND METHOD FOR CONSTRUCTING VIBRATION SUPPRESSION AND/OR SENSING UNITS

(75) Inventors: Baruch Pletner, Newton, MA (US); Gregory A. Zvonar, Winchester, MA (US)

(73) Assignee: IPTrade, Inc., Newton, MA (US)

( * ) Notice: Subject to any disclaimer, the term of this patent is extended or adjusted under 35 U.S.C. 154(b) by 22 days.

(21) Appl. No.: 12/208,119

(22) Filed: Sep. 10, 2008

(65) Prior Publication Data

US 2009/0007672 A1 Jan. 8, 2009

Related U.S. Application Data

(63) Continuation of application No. 11/260,956, filed on Oct. 27, 2005, now Pat. No. 7,482,731.

(60) Provisional application No. 60/654,607, filed on Feb. 18, 2005.

(51) Int. Cl.
*H01L 41/08* (2006.01)
(52) U.S. Cl. .................. 310/311; 310/334; 310/348
(58) Field of Classification Search .................. 310/311, 310/317, 319, 316.01, 348, 334–337
See application file for complete search history.

(56) References Cited

U.S. PATENT DOCUMENTS

| | | | |
|---|---|---|---|
| 3,756,070 A | 9/1973 | McElroy | |
| 4,849,668 A | 7/1989 | Crawley et al. | |
| 5,038,069 A | 8/1991 | Lukasiewicz et al. | |
| 5,053,671 A | 10/1991 | Kobayashi et al. | |
| 5,325,012 A | 6/1994 | Sato et al. | |
| 5,602,757 A | 2/1997 | Haseley et al. | |
| 5,700,116 A | 12/1997 | Cobb, Jr. | |
| 5,970,393 A | 10/1999 | Khorrami et al. | |
| 6,229,898 B1 | 5/2001 | Goodman | |
| 6,252,334 B1 | 6/2001 | Nye et al. | |
| 7,058,362 B1 | 6/2006 | Khorrami et al. | |
| 7,230,532 B2 | 6/2007 | Albsmeier at al. | |
| 7,482,731 B2 * | 1/2009 | Pletner et al. | 310/321 |
| 2003/0205644 A1 | 11/2003 | Najmabadi et al. | |
| 2004/0078170 A1 | 4/2004 | Di Marzio | |
| 2005/0228559 A1 | 10/2005 | Block et al. | |
| 2005/0281391 A1 | 12/2005 | Luo et al. | |

* cited by examiner

*Primary Examiner*—Mark Budd
(74) *Attorney, Agent, or Firm*—Vista IP Law Group LLP

(57) ABSTRACT

Kits and methods for building devices for analyzing or suppressing vibrations in equipment are provided. An electrical-mechanical transducer is configured to be placed in operative contact with the equipment. The transducer may be directly mounted to a base plate that is configured for being mounted to the equipment. A first device (e.g., a printed circuit board) carrying electronic componentry is configured for transmitting vibration drive signals to the electrical-mechanical transducer. A second device (e.g., a printed circuit board) carrying electronic componentry is configured for receiving vibration sensing signals from the electrical-mechanical transducer. The first and second devices can be interchangeably mounted within a housing that can be mounted to the base plate. The housing may comprise an aperture for receiving the electrical-mechanical transducer.

37 Claims, 7 Drawing Sheets

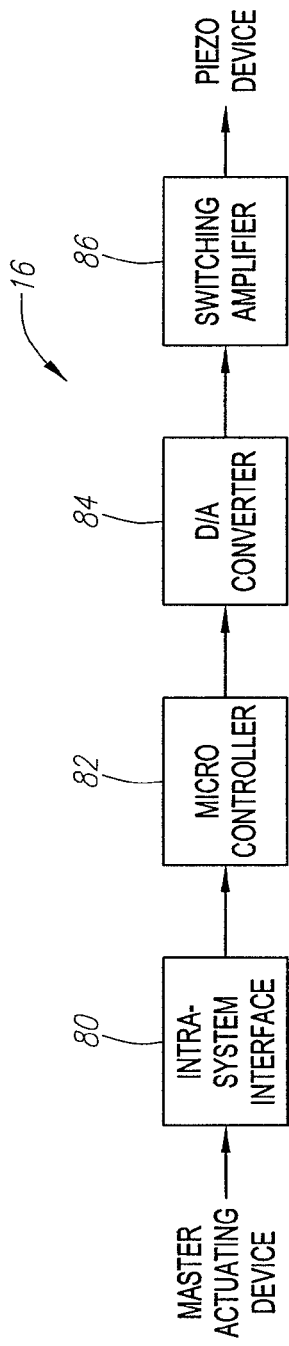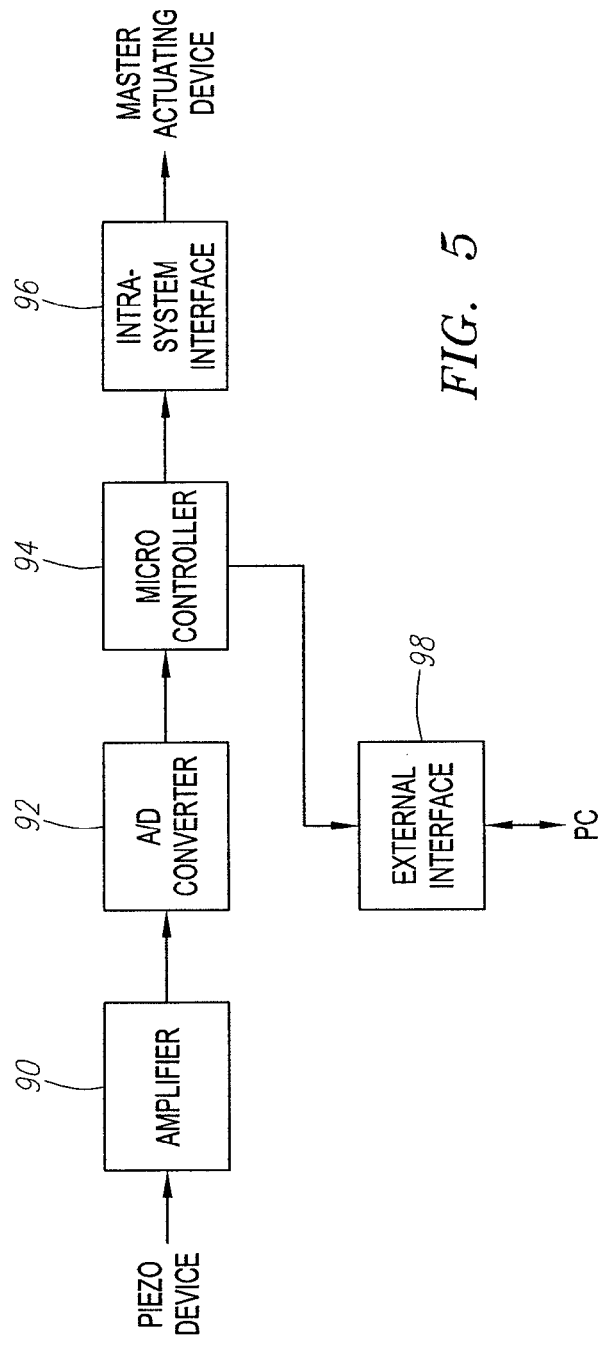
FIG. 4
FIG. 5

KIT AND METHOD FOR CONSTRUCTING VIBRATION SUPPRESSION AND/OR SENSING UNITS

CROSS-REFERENCES TO RELATED APPLICATIONS

The present application is a continuation of U.S. patent application Ser. No. 11/260,956, filed Oct. 27, 2005 now U.S. Pat. No. 7,482,731 which claims priority from U.S. Provisional Application Ser. No. 60/654,607, filed Feb. 18, 2005. The subject matter claimed in this application is related to the subject matter disclosed in U.S. patent application Ser. No. 11/262,083, entitled "Distributed Vibration Analysis and Suppression System with Collocated Control Electronics", and U.S. patent application Ser. No. 11/262,070, entitled "Method for Implementing Vibration Suppression System Under Control from a Remote Site", which are expressly incorporated herein by reference.

FIELD OF THE INVENTION

The present inventions generally relate to the analysis and suppression of structural vibration in apparatus and systems.

BACKGROUND OF THE INVENTION

Structural vibration is one of the key performance limiting phenomena in many types of advanced machinery, such as space launch vehicle shrouds, all types of jet and turbine engines, robots, and many types of manufacturing equipment. For example, semiconductor manufacturing equipment and the equipment used to manufacture micro- and nano-devices are sensitive to structural vibration at ever increasing levels. The positioning accuracy requirements in the most advanced semiconductor manufacturing and test equipment in the market today are on the order of single-digit nanometers.

Because structural vibration depends on many factors that are not easily modeled, such as boundary and continuity conditions, as well as the disturbance environment, it is impossible to design a machine from the first prototype that will meet all vibration requirements. This means that the final steps in analyzing and suppressing vibration are accomplished after the actual production unit has been built. Unfortunately, this is precisely the time that any delay in shipment is the most costly in terms of lost revenue and competitive advantage.

To address this shortfall, it is known to incorporate vibration analysis and suppression systems into precision equipment. In general, a typical vibration analysis and suppression system includes a multitude of vibration sensors and vibration actuators that are installed on-board the precision equipment in selected locations. The system also includes a control system that transmits control signals in accordance with a vibration suppression algorithm to the actuators during normal operation of the precision equipment to mechanically suppress the vibrations. Using a feedback loop, the sensed vibration information is fed back to the control circuitry, which adjusts the control signals in response to dynamic conditions.

Using a combination of feedforward and feedback control theory, the vibration suppression algorithm used by the control circuitry to generate the control signals is selected in accordance with vibration information acquired by the sensors during vibration testing of the precision equipment, preferably before the precision equipment is operated in the field.

The vibration analysis portion of this process is typically implemented during initial vibration testing. In particular, sensors are affixed to select locations on the precision equipment, and operated to sense the response of the precision equipment to artificially induced environmental vibrations. The sensed vibrations are then analyzed to ascertain the nature of the vibration suppression algorithm to be programmed into the control circuitry. Once the algorithm has been programmed, at least some of the sensors will then be replaced with the actuators that will be used to generate the control signals that suppress the environmental vibrations during the feedback control portion of the vibration testing process (to ascertain performance of the control algorithm), as well as during normal operation of the precision equipment in the field (to improve performance by suppressing vibrations at key locations).

The feedback and feedforward control portions of the vibration suppression process are typically implemented both during vibration testing after the vibration suppression algorithm has been programmed into the control circuitry, as well as during normal operation of the precision equipment in the field. In particular, in response to the normal operating environment, the sensors feed back vibration information to the control circuitry, which in response, generates the vibration suppression control signals, the parameters of which are continually adjusted in real-time in response to the varying vibration conditions. In case of predictable and repeated disturbance, such as from cooling fans, etc., the disturbance information as measured by dedicated sensors can be fed forward to the controller to improve control performance even further. These control signals are transmitted to the actuators, which vibrate to suppress the environmental vibrations. Minor adjustments of the vibration suppression algorithm as previously designed can then be performed based on the actual performance of the vibration suppression system.

There are several unresolved issues that can be addressed during vibration testing. For example, because the sensors must be affixed to key locations in the precision equipment in a robust manner (typically using a bonding material, such as epoxy) to ensure the accuracy of the sensed vibration information during feedforward vibration testing, replacement of the sensors with actuators for feedback vibration testing and normal operation of the precision equipment can be a tedious process. In addition, the analysis of the sensed vibration information and programming of the vibration suppression algorithm may sometimes be accomplished by third parties that are remote from the equipment site, and who must, therefore, repeatedly interface with personnel on-site during the iterative vibration information acquisition and algorithm programming process.

There are also unresolved issues that can be addressed during normal operation of the precision equipment in the field. For example, control circuitry currently used in vibration analysis and suppression systems is located remotely from the vibrating part of the precision equipment, typically being hardwired to the on-board sensors and actuators even during the normal operation of the precision equipment. There are several disadvantages to this architecture.

For example, the connecting cables extending from the precision equipment stationary parts, such as electronics cabinets, to the moving parts, such as stages and end effectors, often hinder its normal operation—especially in the case where the sensors and actuators are located on rotating or rapidly translating components. Such cables may in fact introduce unwanted vibrations, at least partially negating the benefits of the vibration suppression system. Significantly, because most vibration actuators, such as piezoceramics, voice coils and others, require a relatively large voltage (typically in the hundreds of volts), the cables are quite bulky, providing a further hindrance to normal operation of the equipment. In addition to the mechanical awkwardness, the use of cables (both from the sensors and to the actuators) also provides a long path through an environment rich in electromagnetic noise that can be injected into the analog signals transmitted between the sensors/actuators and the remotely located control circuitry. As a result, proper control of the actuators may be compromised due to corruption of either the control signals transmitted from the control circuitry to the actuators or the sensing signals transmitted to the control circuitry from the sensors, or both.

There thus remains a need for improved vibration analysis and suppression systems and methods for testing and implementing such systems.

SUMMARY OF THE INVENTION

In accordance with a first aspect of the present inventions, a kit for use in analyzing or suppressing vibrations in equipment is provided. The kit comprises an electrical-mechanical transducer (e.g., a piezoelectric element or an electromagnetic motor such as a voice coil) configured to be placed in operative contact with the equipment, a first device (e.g., a printed circuit board) carrying electronic componentry configured for transmitting vibration drive signals to the electrical-mechanical transducer, a second device (e.g., a printed circuit board) carrying electronic componentry configured for receiving vibration sensing signals from the electrical-mechanical transducer, and a housing in which the first and second devices can be interchangeably mounted.

In an optional embodiment, the housing may be configured for receiving the electrical-mechanical transducer. In another embodiment, the electronic componentry carried by the first device may comprise an amplifier for transmitting the vibration drive signals to the electrical-mechanical transducer, and control circuitry for transmitting vibration suppression control signals to the amplifier. In this case, the control circuitry may be electrically isolated from the amplifier to protect the control circuitry from any current or voltage spikes that may occur at the output of the amplifier.

While the present inventions should not be so limited in their broadest aspects, the ability to interchangeably mount either the first device or the second device within the housing allows the resulting unit to be interchangeably used as a master actuating device, slave actuating device, or sensing device. This can be accomplished even if the electrical-mechanical transducer and/or housing or permanently mounted to the equipment.

In accordance with a second aspect of the present inventions, a method of implementing a vibration suppression system on equipment is provided. The method comprises mounting an electrical-mechanical transducer (e.g., a piezoelectric element) to the equipment, connecting first electronic componentry to the electrical-mechanical transducer, transmitting vibration sensing signals from the electrical-mechanical transducer to the first electronic componentry in response to vibrations in the equipment, removing the first electronic componentry from the electrical-mechanical transducer, connecting second electronic componentry to the electrical-mechanical transducer, and transmitting electrical drive signals from the second electronic componentry to the electrical-mechanical transducer to induce vibrations in the equipment.

The first and second electronic componentry can be conveniently be carried by printed circuit board to facilitate removal and connection of the componentry to and from the electrical-mechanical transducer. In one method, the vibration sensing signals from the first electronic componentry are analyzed, and the second electronic componentry that is subsequently connected to the electrical-mechanical transducer is modified based on the analysis. Modification of the second electronic componentry may be accomplished by programming it with a vibration suppression control algorithm. Thus, although the present inventions should not be necessarily limited in their broadest aspects, it can be appreciated that this method allows a vibration suppression system to be conveniently implemented on equipment by installing a vibration sensing unit to sense vibration signals, and transforming the same unit into a vibration actuating unit that induces vibrations in the equipment.

In accordance with a third aspect of the present inventions, another kit for use in analyzing or suppressing vibrations in equipment is provided. The kit comprises a base plate configured for being mounted to the equipment, and an electrical-mechanical transducer (e.g., a piezoelectric element) configured for being directly mounted to the base plate. The base plate may optionally comprise a recess configured to seat the electrical-mechanical transducer. The recess serves to both properly seat the electrical-mechanical transducer and to make the portion of the base plate through which the electrical-mechanical transducer interfaces with the equipment thinner, thereby maximizing the mechanical transfer function between the electrical-mechanical transducer and the carrier equipment. The base plate may also be configured for transferring vibrations between the electrical-mechanical transducer and the equipment with substantially no loss.

The kit further comprises a case configured for being mounted to the base plate over the electrical-mechanical transducer. The case comprises an aperture for receiving the electrical-mechanical transducer. The kit further comprises electronic componentry configured for being mounted within the case in operative connection with the electrical-mechanical transducer. In an optional embodiment, the kit further comprises an EMI shield configured to be mounted within the case between the electronic componentry and the electrical-mechanical transducer, thereby eliminating exposure of analog signals to EMI. The kit may also optionally comprise a cover configured to enclose the electronic componentry and the electrical-mechanical transducer within the case, thereby fully protecting the enclosed electronic componentry from environmental hazards. While the present inventions should not be so limited in their broadest aspects, the kit provides for a unit that can be easily assembled onto the equipment to analyze or suppress vibrations on the equipment.

The electronic componentry may optionally be configured to be removably mounted within the case, thereby allowing the electronic componentry to be conveniently replaced. The electronic componentry can be conveniently be carried by printed circuit board to facilitate mounting within, and optional removal from, the case. The case may be composed of an electrically insulative material, thereby reducing the risk that the electronic componentry will be damaged by electrostatic or other stray electrical current events. In one embodiment, the electronic componentry comprises an amplifier for supplying vibration drive signals to the electrical-mechanical transducer, and control circuitry for transmitting vibration suppression control signals to the amplifier. In this case, the control circuitry may be electrically isolated from the amplifier to protect the control circuitry from any current or voltage spikes that may occur at the output of the amplifier.

In accordance with a fourth aspect of the present inventions, a method of installing a vibration sensing or actuating device onto equipment is provided. The method comprises mounting a base plate onto the equipment, and permanently mounting an electrical-mechanical transducer (e.g., a piezo-electric element) onto the base plate. The method may optionally comprise seating the electrical-mechanical transducer within a recess of the base plate, with the accompanying advantages described above.

The method further comprises permanently mounting a case to the base plate over the electrical-mechanical transducer, wherein the electrical-mechanical transducer is exposed to the inside of the case. The base plate may be permanently mounted to the equipment, and the electrical-mechanical transducer and casing can be bonded to the base plate. The method further comprises mounting electronic componentry within the case, and operatively connecting the electronic componentry to the electrical-mechanical transducer. The electronic componentry may optionally be removably mounted within the case, thereby allowing the electronic componentry to be conveniently replaced. The electronic componentry can be conveniently be carried by printed circuit board to facilitate mounting within, and optional removal from, the case. The case may be composed of an electrically insulative material, thereby reducing the risk that the electronic componentry will be damaged by electrostatic or other stray electrical current events.

An optional method comprises mounting an EMI shield within the case between the electronic componentry and the electrical-mechanical transducer, thereby eliminating exposure of analog signals to EMI. Another optional method comprises enclosing the electronic componentry and the electrical-mechanical transducer within the case with a cover, thereby fully protecting the enclosed electronic componentry from environmental hazards.

While the present inventions should not be so limited in their broadest aspects, the method provides for a means for easily assembling a unit onto the equipment to analyze or suppress vibrations on the equipment.

Other and further aspects and features of the invention will be evident from reading the following detailed description of the preferred embodiments, which are intended to illustrate, not limit, the invention.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained; a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4 is a functional block diagram of a slave vibration actuating device used in the system of FIG. 1;

FIG. 5 is a functional block diagram of a vibration sensing device used in the system of FIG. 1;

DETAILED DESCRIPTION OF THE PREFERRED EMBODIMENTS

Figure 1:
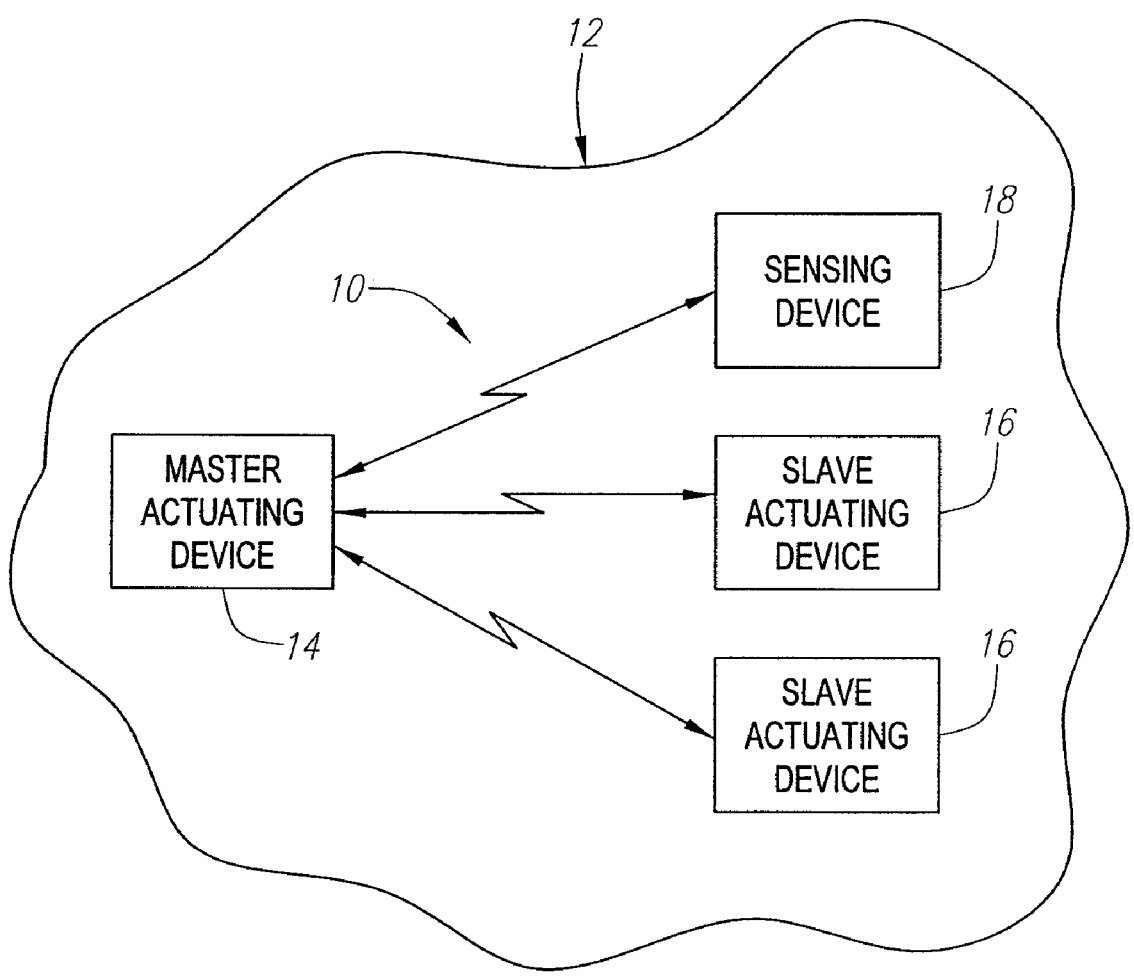
FIG. 1 is a functional block diagram of a vibration analysis and suppression system constructed in accordance with one preferred embodiment of the present inventions.

Referring to FIG. 1, a vibration analysis and suppression system 10 constructed in accordance with one preferred embodiment of the present inventions is described. The system 10 is designed to be used on equipment 12 whose performance is highly sensitive to vibration. The system 10 utilizes a flexible distributed design concept that maximizes the equipment owner's return on investment and ease of implementation. The entire system 10 is designed to be affixed to key locations on the moving parts of the equipment 12, such as the end effector of a robotic arm. Thus, no cables, or at the least no large cables, need be installed between the stationary and moving parts of the equipment 12 during normal operation, thereby eliminating the mechanical awkwardness and electromagnetic interference (EMI) problems associated with prior art architectures. The components of the system 10 are also designed to be attached the equipment 12 in a distributed and modularized fashion, thereby providing maximum flexibility in implementing and testing the system 10.

To this end, the system 10 generally comprises a plurality of vibration actuating devices for mechanically inducing vibrations within the structure of the equipment 12 to suppress the environmental vibrations. These actuating devices can be functionally divided into two types: (1) a single master actuating device 14, which includes all of the necessary control circuitry required to generate vibration control signals in accordance with an on-board vibration suppression algorithm; and (2) a plurality of vibration slave devices 16 controlled by the master actuating device 14. That is, the master actuating device 14 generates and transmits vibration control signals to the slave actuating devices 16, which respond by inducing vibrations within the structure of the equipment 12. Thus, it can be appreciated that, in contrast to prior art architectures wherein the control circuitry was remotely connected to the actuators via cables, the control circuitry is located in the master actuating device 12. The system 10 further comprises a vibration sensing device 18 for sensing vibrations within the equipment 12 and feeding vibration response information back to the master actuating device 14, which generates the vibration control signals in response thereto. Although only one sensing device 18 is illustrated, the system 10 can include additional sensing devices, so that the vibrations in the equipment 12 can be analyzed in a more robust and thorough manner.

Significantly, communication between the master actuating device 14, slave actuating device 16, and sensing device 18 is preferably performed using digital means in order to minimize EMI. As will be described in further detail below, each of these devices is packaged in a self-contained EMI shielding unit, altogether eliminating exposure of analog signals to EMI during operation of the system 10. Also, communication between the devices is preferably accomplished wirelessly, so that cables, which may otherwise limit the placement of the devices at key locations, are eliminated. As will be described in detail below, vibration analysis and programming of the master actuating device 14 can be accomplished remotely through the use of a specialized communications means.

Figure 2:
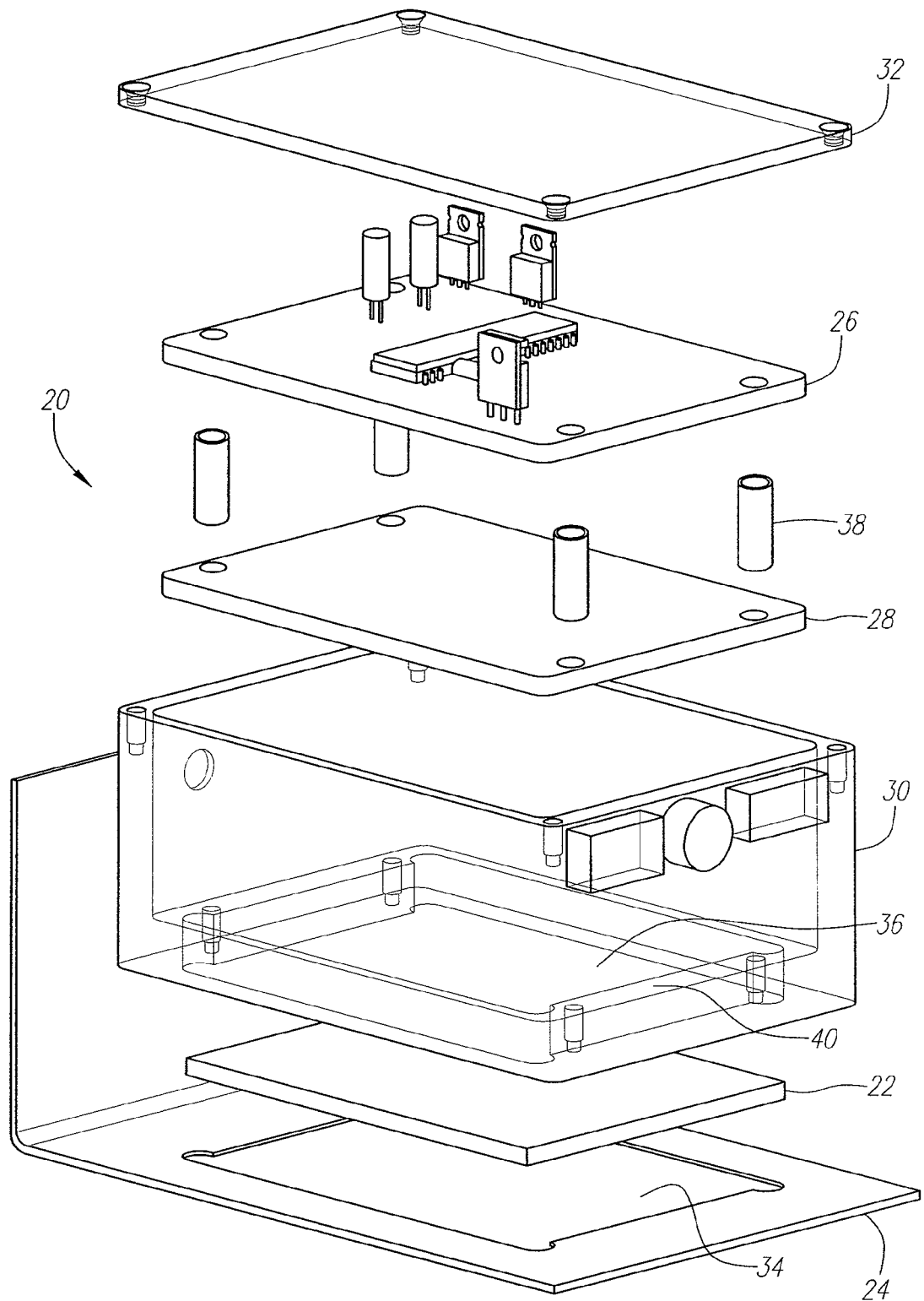
FIG. 2 is an exploded view of a self-contained unit that can be used to implement one of the master vibration actuating device, slave vibration actuating devices, or vibration sensing device used in the system of FIG. 1.

Referring now to FIG. 2, a self-contained unit 20, which can be interchangeably used as a master actuating device 14, a slave actuating device 16, or a sensing device 18, will now be described. The unit 20 comprises a thin plate of piezo material (in particular, lead zirconium titanate (PZT)) 22, which, depending on the interfacing electronic circuitry, can either function as a strain actuator to induce planar strains in the carrier structure (i.e., the portion of the equipment to which the actuator 12 is affixed) or a strain sensor to sense plane strains within the carrier structure. The piezo plate 22 may be formed of a single PZT layer, but preferably is formed of multiple PZT layers (e.g., two or four layers). The piezo plate 22 mechanically interfaces with the carrier structure via a thin stainless steel base plate 24 that is permanently mounted to the carrier structure.

The unit 20 also comprises a printed circuit board (PCB) 26 that carries the electronic circuitry used to interface with the piezo plate 22 to perform either of the vibration actuating or sensing functions. In the embodiment illustrated in FIG. 2, the PCB 26 is shown carrying the electronic circuitry that enables the unit 20 to perform the functions of the master actuating device 14. However, as will be described in further detail below, the PCB 26 can easily be replaced with another PCB (not shown) that will enable the unit 20 to perform the functions of the slave actuating device 16 or the sensing device 18. To ensure that the unit 20 can effectively be used in electronically dense manufacturing environments, the unit 20 further comprises a stainless steel EMI shield 28 to reduce EMI interference with adjacent electronic devices.

The unit 20 further comprises a protective case 30 and associated cover 32, which are preferably composed of an electrically insulative material, such as clear acrylic, thereby reducing the risk that the electronic circuitry contained in the PCB 26 will be damaged by electrostatic or other stray electrical current events. The case 30, which when mounted to the base plate 24, also facilitates firm contact between the piezo plate 22 and base plate 24, while providing full protection from accidental impacts that may otherwise damage the fragile piezo plate 22, thereby allowing the unit 20 to be shipped and stored with little risk of breakage.

In particular, the piezo plate 22 is suitably bonded within a recess 34 formed in the lower section of the base plate 24. This recess 34 serves to both properly seat the piezo plate 22 relative to the case 30, which will be suitably bonded onto the base plate 24, and to make the portion of the base plate 24 through which the piezo plate 22 interfaces with the carrier structure thinner, thereby maximizing the mechanical transfer function between the piezo plate 22 and the carrier structure. An aperture 36 is formed at the bottom of the case 30 for receiving the piezo plate 22, thereby encasing the piezo plate 22 between the base plate 24 and case 30 when bonded together. This robust mechanical packaging feature also eliminates the need to encase the piezo plate 22 in polyimide, thereby improving strain transfer characteristics with the carrier structure and increasing electromechanical efficiency.

It should be noted that, while the case piezo plate 22 and case 30 are irreversibly bonded to the base plate 24, there should be no need for field removal of the piezo plate 22, and in fact, it would be undesirable to handle the piezo plate 22 that is not bonded to the base plate 24 due to its fragility. Thus, once the piezo plate 22, base plate 24, and case 30 are integrated into a permanent unit, it is not anticipated that the unit 20 will be removed from the equipment 12. However, should it become necessary to de-bond the unit 20 from the equipment 12, the unit 20 is designed, such that the PCB 26, which is the highest-cost component of the unit 20, can be easily removed from the unit 20 to protect it. Thus, although the piezo plate 22, base plate 24, and case 30 will likely be destroyed during the de-bonding process, the loss to the owner will be limited.

To this end, the PCB 26 is mounted within the case 30 in an easily removable manner. In particular, the PCB 26 and EMI shield 28, which are separated from each other by spacers 38, are mounted to the top surface of a ledge 40 located at the bottom of the case 30 via bolts (not shown) above the piezo plate 22. The EMI shield 28 comprises a small aperture (not shown) through which a cable (such as flexible connecting ribbon) (not shown) can be threaded between the PCB 26 and the piezo plate 22. One end of the ribbon is hardwired to the appropriate location on the piezo plate 22, and its free end is removably mated with a pin connector (not shown) on the PCB 26. Thus, it can be appreciated that the PCB 26 can be removed from the unit 20 simply by removing the cover 32 from the case 30, removing the bolts from the PCB/EMI shield assembly, and disconnecting the ribbon from the pin connector. In the case where it is desired to replace the PCB 26 with another PCB, either because it is damaged or faulty, or because it is desired to transform the functionality of unit 20 between a master actuating device 14, slave actuating device 16, and sensing device 18, the new PCB can be reinstalled into the unit 20 simply be mounting the PCB/EMI assembly within the case 30 using the bolts, reconnecting the connecting ribbon to the pin connector of the new PCB, and placing the cover 32 back onto the case 30.

Figure 3:
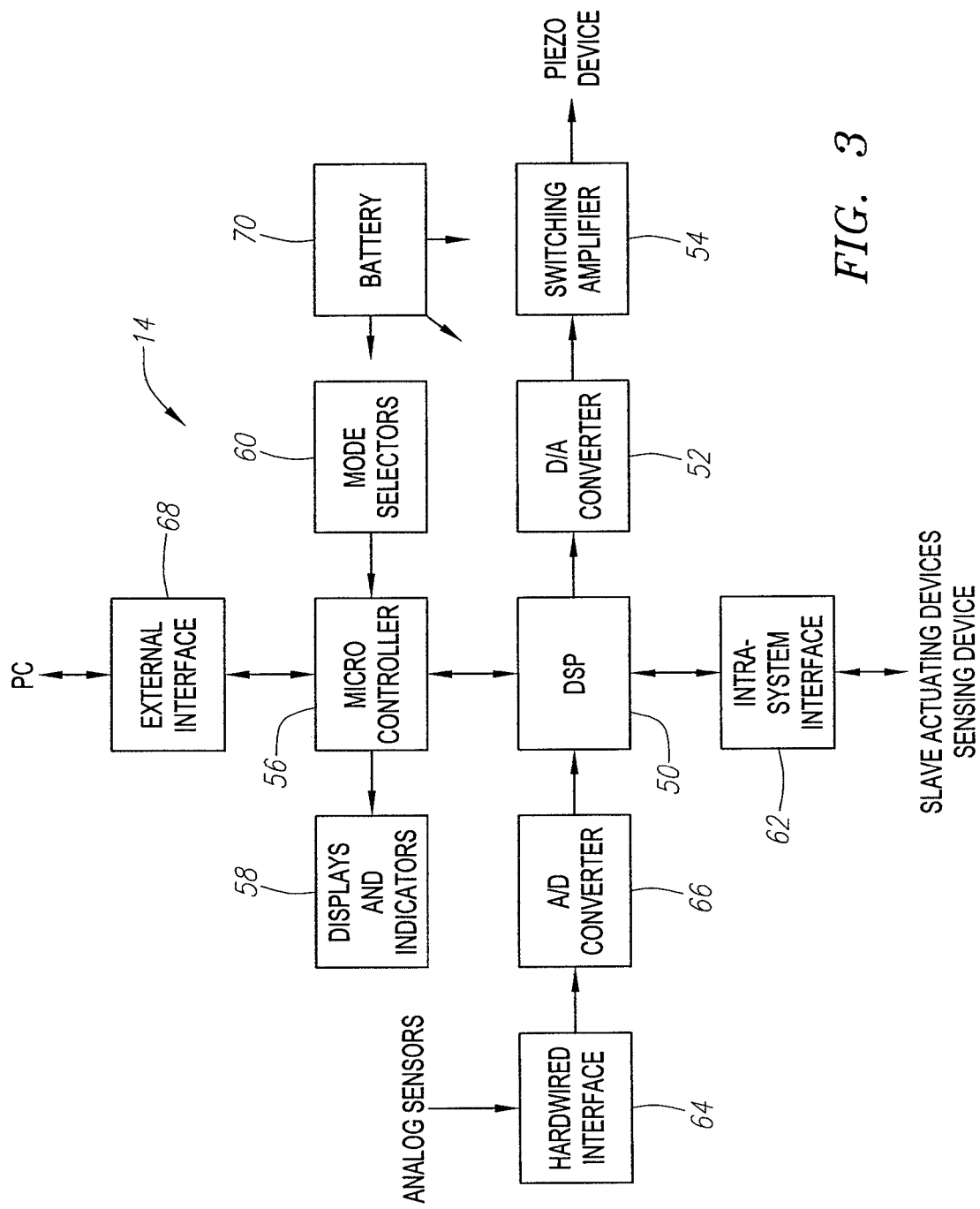
FIG. 3 is a functional block diagram of a master vibration actuating device used in the system of FIG. 1.

Referring now to FIGS. 3-5, the detailed electronic componentry of each of the master actuating device 14, slave actuating device 16, and sensing device 18 will be described. As discussed above, this electronic componentry will be carried by a PCB, such as the PCB 26 illustrated in FIG. 2.

Referring first to FIG. 3, the master actuating device 14 comprises a digital signal processor 50, which includes programmable memory, such as flash memory, for storing a vibration suppression algorithm in the form of embedded software and for collecting data, such as test vector data and sensing data that will be used by the digital signal processor 50 to perform feedforward and feedback control. The digital signal processor 50 is configured for generating digital control signals in accordance with the vibration suppression algorithm, which signals will ultimately be used by the master actuating device 14, as well as the slave actuating devices 16, to induce vibrations in the structure. In the embodiment illustrated in FIG. 3, the digital control signals are used to control a high-voltage amplifier. In particular, the master actuating device 14 further includes a digital-to-analog (D/A) converter 52 for converting the digital control signals into low voltage analog control signals, and a high voltage switching amplifier 54 (e.g., 50-100V), for converting the low voltage analog control signals into high-voltage low current analog signals (e.g., a sine sweep or band-limited white noise) used to stimulate the on-board piezo device (i.e., the piezo plate 22 illustrated in FIG. 2). It should be appreciated that other types of high-voltage amplifiers other than switching amplifiers can be used. For example, a high-voltage linear amplifier can be used, in which case, a pulse-width-modulating (PWM) element, instead of the D/A converter 52, can be used between the digital signal processor 50 and the high-voltage amplifier.

The master actuating device 14 comprise an optional microcontroller 56, which when combined with the digital signal processor 50, allows the master actuating device 14 to implement more advanced control techniques, such as non-linear and adaptive control. The microcontroller 56 also provides a means for controlling the functioning of the digital signal processor 50, e.g., uploading vibration suppression algorithms or other control data. The master actuating device 14 may also include displays and indicators 58 to allow the microcontroller 56 to provide status, such as proper operation and faults, and mode selectors 60, such as buttons or contacts, to control the modes of the master actuating device 14 via the microcontroller 56.

The master actuating device 14 includes various means for communicating with other devices. In particular, the master actuating device 14 includes an intra-system communications interface 62 for transmitting the digital control signals to the slave actuating devices 16 and receiving digital sensing signals from the sensing device 18. In the illustrated embodiment, the communications interface 62 is a wireless high-speed digital communications interface, such as CAN or I2C. However, an analog interface can be used to communicate with the other devices primarily for self test and other utility purposes. In actual operation, such an interface would not be as desirable, since it will expose the analog signals to EMI. In any event, the communications interface 62 may be bidirectional to allow for Multi-Input/Multi-Output system identification. The master actuating device 16 optionally includes a hardwired interface 64 for receiving analog vibration response information from prior art sensing devices, and an analog-to-digital (A/D) converter 66 for converting the analog information into digital information for use by the digital signal processor 50. The master actuating device 14 also includes an external interface 68 for communicating with an external personal computer (PC), e.g., to facilitate uploading of the vibration suppression algorithm and other information from the PC to the master actuating device 14, and downloading of vibration response information from the master actuating device 16 to the PC. The external interface 68 may be wired, e.g., a USB port, or wireless, utilizing industry standard protocols, such as Bluetooth or Zigby.

In the illustrated embodiment, the master actuating device 14 comprises a low voltage, preferably rechargeable, battery 70 (e.g., 12 volts) that supplies the electronics with the required direct current (DC) power. In this manner, the master actuating device 14 need not be connected to an external power source, thereby eliminating the need for external cables altogether. To the extent that the use of a battery is not desirable, power can be supplied from an external source via a slip ring, thereby obviating the need for cables. It should be noted, however, that even if a cable is used, it will typically be much smaller than the high voltage cables required in prior art architectures.

In an optional embodiment, the high-voltage switching amplifier 54 is electrically isolated from the remaining circuitry of the master actuating device 14 to prevent ground loops from occurring when some of the voltage applied to the piezo device leaks into the master actuating device 14. In particular, if the output of the high-voltage switching amplifier 54 uses the same ground as the remaining circuitry within the master actuating device 14, the master actuating device 14 can experience a current or voltage spike, thereby causing it to at least temporarily malfunction and potentially trigger a system wide shutdown.

Figure 8:
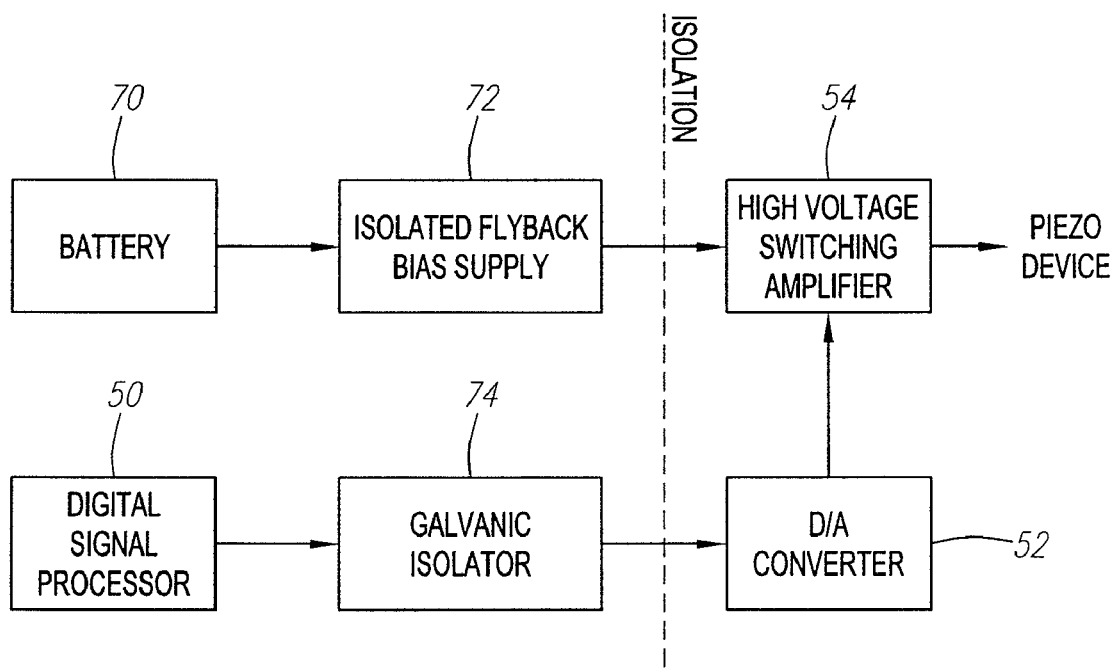
FIG. 8 is a functional block diagram of an implementation that electrically isolates the high-voltage amplifier in the master actuating device of FIG. 3 from the remaining componentry of the master actuating device.

For example, FIG. 8 illustrates an optional embodiment wherein the high-voltage switching amplifier 54 is electrically isolated from various other components of the master actuating device 14. Both the power lines and the control lines are electrically isolated between the amplifier 54 and other components of the master actuating device 14. In particular, DC power is supplied from the battery 70 (or other power source) to the switching amplifier 54 through an isolated flyback bias supply 72, which in the illustrated embodiment, transforms a 48V supply into 120V supplied to the switching amplifier 54, and 5V supplied to the circuitry of the master actuating device 14, including the switching amplifier 54. Control signals are supplied from the digital signal processor 50 to the D/A converter 52, and thus, the switching amplifier 54, through a galvanic (magnetic) coupler 74. It can be appreciated that other types of non-electrical couplers can be used, e.g., optocouplers, to transmit signals from the digital signal processor 50 to the switching amplifier 54. Thus, because the power and control lines connected to the switching amplifier 54 are electrically isolated from the components of the master actuating device 14, any voltage leakage from the piezo element will not result in a ground loop.

Referring now to FIG. 4, the slave actuating device 16 is similar to the master actuating device 14, with the exception that the slave actuating device 16 only comprises the circuitry needed to transform the digital control signal into the high voltage low current analog signal. That is, the slave actuating device 16 only includes an intra-system communications interface 80 (similar to the one used by the master actuating device 14) for receiving the digital control signals transmitted by the master actuating device 14, a microcontroller 82 for controlling the data received on the communications interface 80, a D/A converter 84 for converting the digital control signals from the microcontroller 82 into low voltage analog control signals, and a high-voltage switching amplifier 86 for converting the low voltage analog control signals into high voltage low current analog signals used to stimulate the on-board piezo device. Like the master actuating device 14 illustrated in FIG. 8, the high-voltage switching amplifier 86 may be electrically isolated from various components within the slave actuating device 16 to prevent or minimize the adverse effects caused by voltage or current spikes at the piezo device.

Referring now to FIG. 5, the sensing device 18 comprises a high impedance charge amplifier 90 for sensing the charge induced in the on-board piezo device by the strain exerted on the piezo device by the structural vibrations, and converting it to a low voltage analog signal. The sensing device 18 further comprises an A/D converter 92 for converting the low voltage analog signal into a digital signal representative of the magnitude and phase of the piezo strain. The sensing device 18 further includes a microcontroller 94 for controlling the sensing data from the A/D converter 92, and an intra-system communications interface 96 (similar to the one used by the master actuating device 14) for transmitting the sensing data to the master actuating device 14. The sensing device 18 may optionally include an external communications interface 98 (similar to the one used in the master actuating device 14) for communicating with an external PC, e.g., to facilitate downloading of vibration response information from the sensing device 18 to the PC. This feature may be useful when it is merely desired to acquire vibration response information for subsequent analysis, or when the master actuating device 14, which is configured for downloading vibration response information to the PC, is otherwise not installed or operational.

In the afore-described embodiments of the slave actuating device 16 and sensing device 18, power is provided either using a battery or a wired connection from the master actuating device 14. In the case where it is desirable to supply both power and communications from the master actuating device 14 to the slave actuating devices 16 and sensing device 18 through a wired connection, or both power and communications from an external device to the master actuating device 14, a Power over Ethernet (POE) methodology can be used in accordance with IEEE 802.3af to deliver the power/communications signals. IEEE 802.3af provides the capability of deliver both power and data over standard Ethernet cabling, such as CAT5 or CAT6 cable. This eliminates the need for separate signal and power cables and enables the use of commonly available standard CAT5 cable equipped with a standard RJ45 plug.

Figure 6:
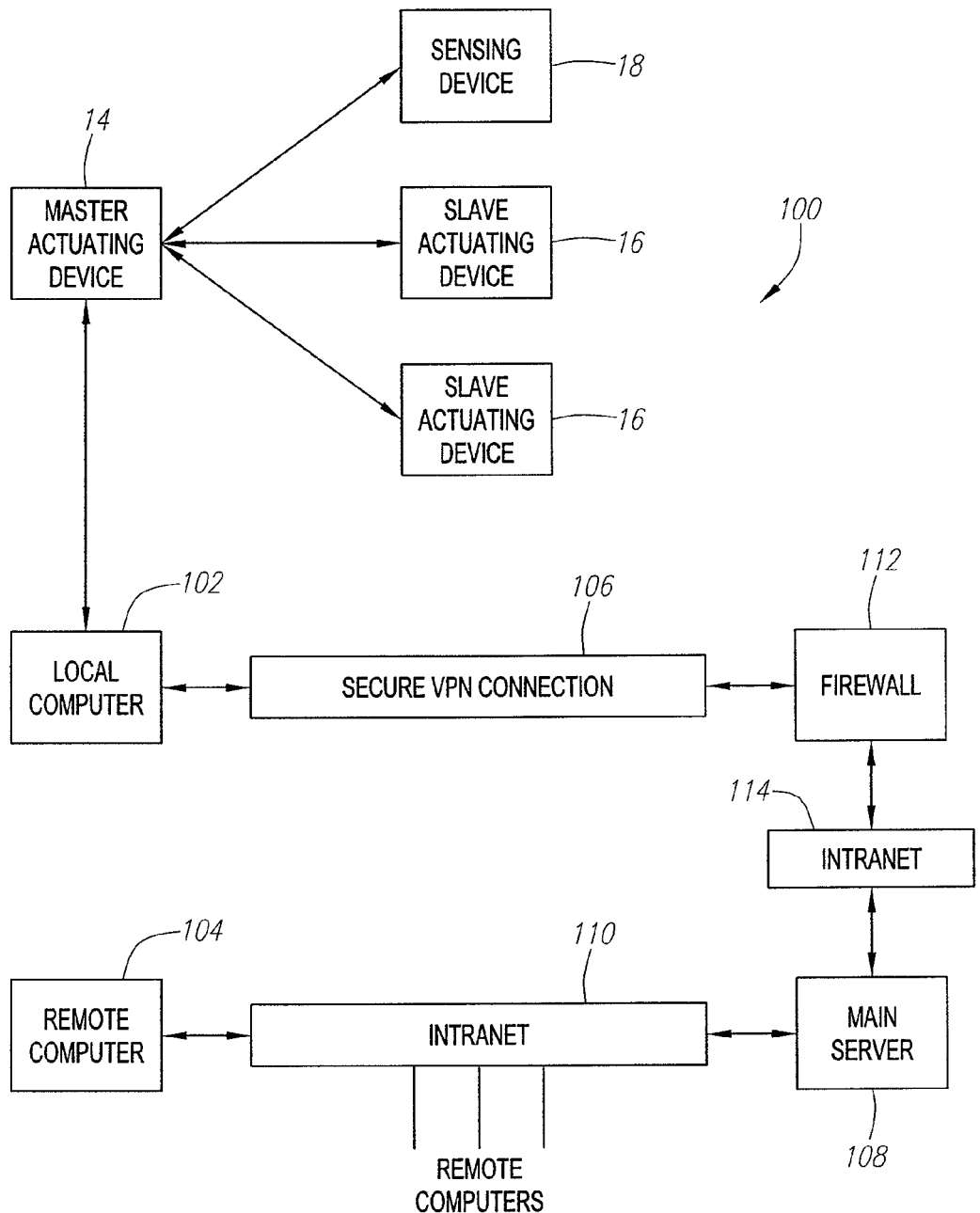
FIG. 6 is a functional block diagram of one preferred embodiment of a communications system used to remotely download environmental vibration information from a sensing device for analysis, upload vibration suppression algorithms to a master actuating device, and download closed-loop vibration information from the sensing device.

Referring to FIG. 6, a communications system 100 can be used to facilitate analysis of the structural dynamics of the equipment 12, implementation of the control aspects of the system 10 based on this analysis, and evaluation of the performance of the system 10, all from a remote site. In particular, the communications system 100 comprises a local computer 102 (such as a personal computer (PC)) residing at the customer or local site (i.e., the site at which the equipment 12 is located), and a remote computer 104 (such as a PC) located at a vibration analysis laboratory, such as IPTRADE Inc, located in Newton, Mass. The local computer 102 is connected to the master actuating device 14 via the external communications interface 68 (shown in FIG. 3), and is connected to the remote computer 104 via a secure Virtual Private Network (VPN) connection 106. If multiple computers are located at the remote site, the communications system 100 may optionally include a main server 108 connected to the computers via an intranet 110 to facilitate communication between the local computer 102 and one or more of the remotes computer 104. To provide further data security, the communications system 100 may include a firewall 112 connected between the secure VPN connection 106 and the main server 108 via an intranet 114.

A specialized software package is installed on the local computer 102 to facilitate communications between the master actuating device 14 and the remote computer 104. In particular, the software package enables a secure link between the local computer 102 and the remote computer 104, establishes a direct and secure communications link between the remote computer 104 and the master actuating device 14, and enables control engineers at the remote site to control the master actuating device 14 to perform such tasks as system identification, control design, control implementation, and performance evaluation. Thus, it can be appreciated that, with the exception of physically installing the system 10 onto the equipment 12, a control engineer physically located at the remote site can operate the system 10 in the same manner as if he or she were present at the local site.

Referring still to FIG. 6, one scenario for implementing the system 10 will be described. In this scenario, it is determined that a structural component on the equipment 12, such as a robotic end effector, has an unacceptable vibration level. Using finite element analysis, it is determined that the areas of high strain arising from the structural vibrations can be accurately covered using three actuating devices: a master actuating device 14 and two slave actuating devices 16. The sensing device 18 is used to sense vibrations in the equipment 12. Alternatively, a third party sensor, such as an accelerometer or capacitive distance probe, can be used to sense the vibrations, or more alternatively, both types of sensors can be used. After deploying the sensing device 18, as well as the master actuating device 14 in the case where the sensing device 18 is not capable of directly communicating with the local computer 102, an engineer at the local site activates the specialized software package installed on the local computer 102 to establish a secure link to the main server 108, and thus, the remote computer 104.

The control engineer at the remote site can then implement a data acquisition protocol to acquire vibration response information from the sensing device 18. In particular, a first prompt is transmitted from the remote computer 104 to the local computer 102 via the secure VPN connection 106, which prompts the sensing device 18 to automatically collect and download vibration response information to the local computer 102 via the master actuating device 14. In response to the first prompt, or alternatively in response to another prompt from the remote computer 104, the vibration response information is then acquired at the remote computer 104 from the local computer 102 via the secure VPN connection 106, thereby allowing the control engineer to obtain an accurate picture of the structural dynamics of the equipment 10. Alternatively, although requiring more coordination between the remote and local sites, personnel at the remote site can remotely prompt the sensing device 18 to automatically collect and download vibration response information to the local computer 102, and the downloaded information is then transmitted from the local computer 102 to the remote computer 102 under control of personnel at the local site. In either event, once the vibration response information is acquired at the remote site, the control engineer can create and simulate a vibration suppression algorithm, and predict the key locations on the equipment 12 where the actuating devices should be mounted.

After the slave actuating devices 16, and if not installed yet, the master actuating device 14, are deployed at the key locations, a second prompt, along with the vibration suppression algorithm, is transmitted from the remote computer 104 to the local computer 102 via the secure VPN connection 106, where it is automatically uploaded to the master actuating device 14. The slave actuating devices 16, and if not installed yet, the master actuating device 14, are then installed at the most advantageous locations on the equipment 12 based on the analysis performed by the remote control engineer.

Next, a third prompt is transmitted from the remote computer 104 to the local computer 102, thereby operating the master actuating device 14, along with the slave actuating devices 16, and collecting closed-loop vibration response information at the sensing device 18, which is then downloaded to the local computer 102 via the master actuating device 14. In response to the third prompt, or alternatively another prompt from the remote computer 104, the sensed closed-loop vibration response information is then acquired at the remote computer 104 from the local computer 102 via the secure VPN connection 106. Alternatively, although requiring more coordination between the remote and local sites, personnel at the remote site can remotely prompt operation of the actuating devices and collection and downloading of the vibration response information, and the downloaded information can then be transmitted from the local computer 102 to the remote computer 102 under control of personnel at the local site. In either case, the control engineer at the remote site compares the vibration response information to the simulated performance, and based on this comparison, fine-tunes the vibration suppression algorithm. A fourth prompt, along with the modified vibration suppression algorithm, is then transmitted from the remote computer 104 to the local computer 102 via the secure VPN connection 106, where it is automatically uploaded and "burned" onto the flash memory within the master actuating device 14. If using a wired connection, the local computer 102 is disconnected from the master actuating device 14, allowing the devices to be operated as a stand-alone system 10.

While the physical implementation of hardware during the data acquisition and testing phase of the system 10 must still be accomplished by personnel at the local site, it should be appreciated that the methodology described with respect to FIG. 6 allows the control, operation, and data acquisition at the local site to be accomplished from the remote site without interaction, or with minimal interaction, with personnel at the local site.

Figure 7:
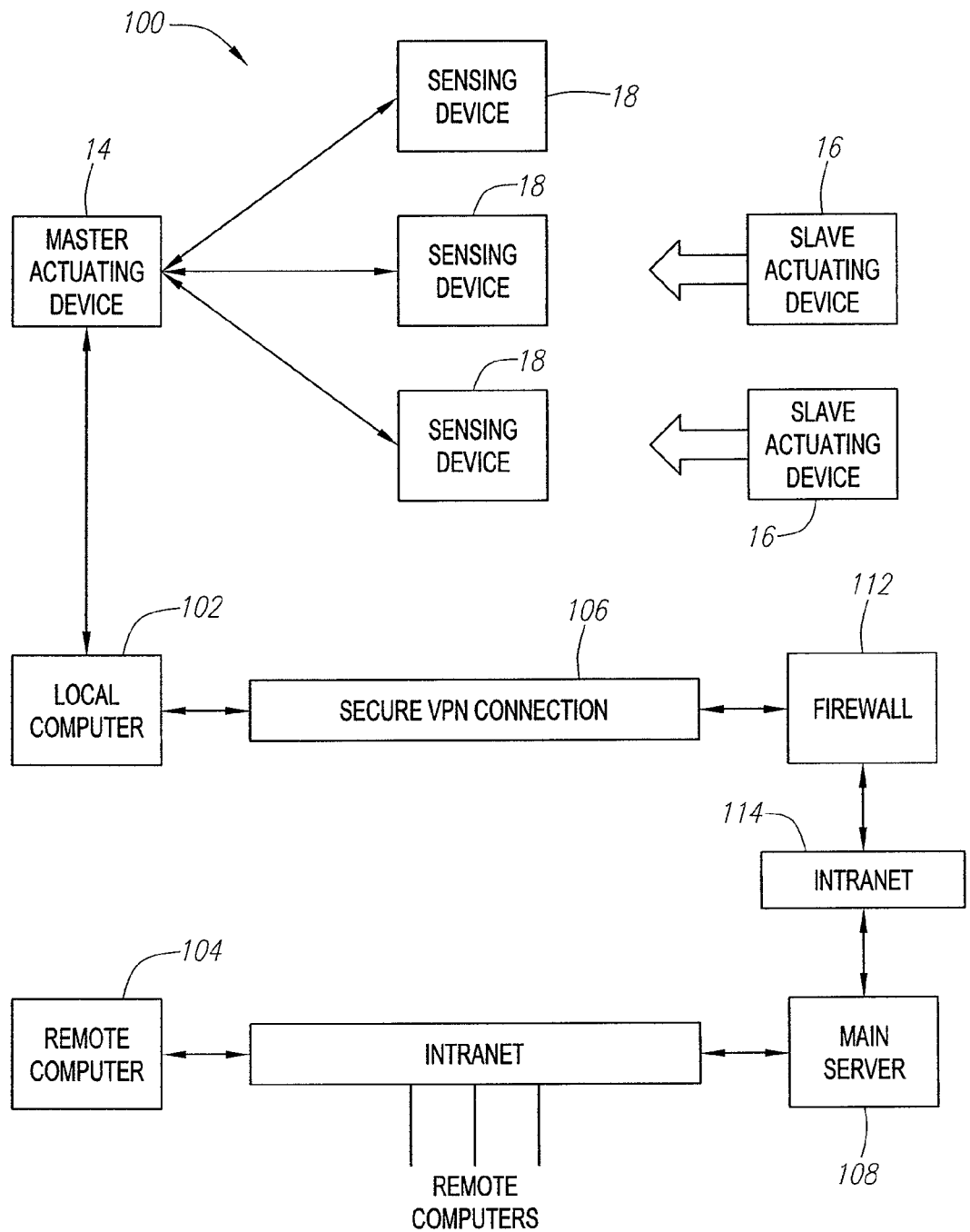
FIG. 7 is a functional block diagram of one preferred embodiment of a communications system used to remotely induce vibrations within the equipment, and download resulting vibration information from a plurality of sensing devices for analysis.

Referring now to FIG. 7, another scenario for implementing the system 10 will be described. In this scenario, a reliable model of the structure of the equipment 12 in question does not exist or is not considered reliable, thereby requiring an experimental determination of the structural dynamics and high strain areas of the vibration mode shapes. In this case, the engineer at the local site deploys a master actuating device 14 in conjunction with a plurality of sensing devices 18 (in this case, three). As in the other scenario, third party sensors can be used alone or in combination with one or more sensing devices 18. The control engineer at the remote site then transmits a prompt from the remote computer 104 to the local computer 102 via the VPN connection 106, which prompts the master actuating device 14 to generate a probing signal, such as a sine wave sweep, thereby causing the on-board piezo device to induce the probe signal into the structure. The sensing devices 18 collect and download vibration response information to the local computer 102 via the master actuating device 14. The response information is then acquired at the remote computer 104 from the local computer 102 via the secure VPN connection 106, where the control engineer uses the information to implement the system 10 in the same manner described above. Notably, if the sensing devices 18 are physically located at key actuating locations, at least some of them can be replaced with slave actuating devices 16, as illustrated in FIG. 6. This can be easily accomplished, e.g., by exchanging the PCBs, while keeping the collocated piezo devices attached to the carrier structure, thus avoiding any time consuming and mechanically difficult removal and attachment operations, as discussed above with respect to FIG. 2.

It should be appreciated that the methodologies discussed with respect to FIGS. 6 and 7 can be implemented in computer software that can be executed in the local computer 102 to perform the functions at the local site, and implemented in computer software that can be executed in the remote computer 104 to perform the functions at the remote site.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A kit for use in analyzing or suppressing vibrations in equipment, comprising:
   an electrical-mechanical transducer configured for being placed in operative contact with the equipment;
   a first device carrying electronic componentry configured for transmitting vibration drive signals to the electrical-mechanical transducer;
   a second device carrying electronic componentry configured for receiving vibration sensing signals from the electrical-mechanical transducer, wherein the first and second devices have different functions; and
   a housing in which the first and second devices can be interchangeably mounted.

2. The kit of claim 1, wherein the electrical-mechanical transducer is a piezoelectric element.

3. The kit of claim 1, wherein the first and second devices are printed circuit boards.

4. The kit of claim 1, wherein the housing is configured for receiving the electrical-mechanical transducer.

5. The kit of claim 1, wherein the electronic componentry carried by the first device comprises an amplifier for transmitting the vibration drive signals to the electrical-mechanical transducer, and control circuitry for transmitting vibration suppression control signals to the amplifier, wherein the control circuitry is electrically isolated from the amplifier.

6. A method of implementing a vibration suppression system on equipment, comprising:
   mounting an electrical-mechanical transducer to the equipment;
   connecting first electronic componentry to the electrical-mechanical transducer;
   transmitting vibration sensing signals from the electrical-mechanical transducer to the first electronic componentry in response to vibrations in the equipment;
   removing the first electronic componentry from the electrical-mechanical transducer;
   connecting second electronic componentry to the electrical-mechanical transducer; and
   transmitting electrical drive signals from the second electronic componentry to the electrical-mechanical transducer to induce vibrations at equipment.

7. The method of claim 6, wherein the electrical-mechanical transducer comprises a piezoelectric element.

8. The method of claim 6, wherein the first and second electronic componentry are carried by printed circuit boards.

9. The method of claim 6, further comprising analyzing the vibration sensing signals, and modifying the second electronic componentry based on the analysis.

10. The method of claim 9, wherein the second electronic componentry is modified by programming it with a vibration suppression control algorithm.

11. A kit for use in analyzing or suppressing vibrations in equipment, comprising:
   a base plate configured for being mounted to the equipment;
   an electrical-mechanical transducer configured for being directly mounted to the base plate;
   a case configured for being mounted to the base plate over the electrical-mechanical transducer, wherein the case comprises an aperture for receiving the electrical-mechanical transducer; and
   electronic componentry configured for being mounted within the case in operative connection with the electrical-mechanical transducer.

12. The kit of claim 11, wherein the electrical-mechanical transducer comprises a piezoelectric element.

13. The kit of claim 11, wherein the electronic componentry is carried by a printed circuit board.

14. The kit of claim 11, wherein the base plate comprises a recess configured for seating the electrical-mechanical transducer.

15. The kit of claim 11, further comprising an electromagnetic interference (EMI) shield configured for being mounted within the case between the electronic componentry and the electrical-mechanical transducer.

16. The kit of claim 11, wherein the electronic componentry is configured for being removably mounted within the case.

17. The kit of claim 11, further comprising a cover configured for enclosing the electronic componentry and the electrical-mechanical transducer within the case.

18. The kit of claim 11, wherein the case is composed of an electrically insulative material.

19. The kit of claim 11, wherein the base plate is configured for transferring vibrations between the electrical-mechanical transducer and the equipment with substantially no loss.

20. The kit of claim 11, wherein the electronic componentry comprises an amplifier for transmitting vibration drive signals to the electrical-mechanical transducer, and control circuitry for transmitting vibration suppression control signals to the amplifier, wherein the control circuitry is electrically isolated from the amplifier.

21. A method of installing a vibration sensing or actuating device onto equipment, comprising:
mounting a base plate onto the equipment;
permanently mounting an electrical-mechanical transducer onto the base plate;
permanently mounting a case to the base plate over the electrical-mechanical transducer, wherein the electrical-mechanical transducer is exposed to the inside of the case;
mounting electronic componentry within the case; and
operatively connecting the electronic componentry to the electrical-mechanical transducer.

22. The method of claim 21, wherein the electrical-mechanical transducer comprises a piezoelectric element.

23. The method of claim 21, wherein the electronic componentry is carried by a printed circuit board.

24. The method of claim 21, further comprising seating the electrical-mechanical transducer within a recess formed within the base plate.

25. The method of claim 21, further comprising mounting an electromagnetic interference (EMI) shield within the case between the electronic componentry and the electrical-mechanical transducer.

26. The method of claim 21, wherein the electronic componentry is removably mounted within the case.

27. The method of claim 21, further comprising enclosing the electronic componentry and the electrical-mechanical transducer within the case with a cover.

28. The method of claim 21, wherein the case is composed of an electrically insulative material.

29. The method of claim 21, wherein the base plate is permanently mounted to the equipment.

30. The method of claim 21, wherein the electrical-mechanical transducer and casing are bonded to the base plate.

31. The kit of claim 1, wherein the first device is a dedicated actuating device, and the second device is a dedicated sensing device.

32. The kit of claim 1, wherein the housing has a ledge on which the first device and the second device can be interchangeably mounted.

33. The kit of claim 16, wherein the electronic componentry is configured for being removed from the case without destroying the case.

34. The method of claim 26, wherein the electronic componentry is configured for being removed from the case without destroying the case.

35. The kit of claim 1, wherein the first device has a first connector configured for being removably mated with the electrical-mechanical transducer, and the second device has a second connector configured for being removably mated with the electrical-mechanical transducer.

36. The kit of claim 1, further comprising fasteners configured for removably mounting each of the first and second devices within the housing.

37. The kit of claim 1, wherein the first device is one of a master actuating device, a slave actuating device, and a sensing device, and the second device is a different one of the master actuating device, slave actuating device, and sensing device.

* * * * *